US012355329B2

(12) United States Patent
Nakayama et al.

(10) Patent No.: US 12,355,329 B2
(45) Date of Patent: Jul. 8, 2025

(54) ROTARY MACHINE WITH ELECTRIC MOTOR AND INVERTER

(71) Applicant: IHI Corporation, Tokyo (JP)

(72) Inventors: Shun Nakayama, Tokyo (JP); Koji Sakota, Tokyo (JP); Yuji Sasaki, Tokyo (JP)

(*) Notice: Subject to any disclaimer, the term of this patent is extended or adjusted under 35 U.S.C. 154(b) by 273 days.

(21) Appl. No.: 18/165,932

(22) Filed: Feb. 8, 2023

(65) Prior Publication Data

US 2023/0187997 A1 Jun. 15, 2023

Related U.S. Application Data

(63) Continuation of application No. PCT/JP2021/026859, filed on Jul. 16, 2021.

(30) Foreign Application Priority Data

Aug. 11, 2020 (JP) ................................. 2020-135825

(51) Int. Cl.
*H02K 5/20* (2006.01)
*H02K 5/22* (2006.01)
*H02K 7/00* (2006.01)
*H02K 7/14* (2006.01)

(52) U.S. Cl.
CPC .............. *H02K 5/20* (2013.01); *H02K 5/225* (2013.01); *H02K 7/003* (2013.01); *H02K 7/14* (2013.01)

(58) Field of Classification Search
CPC .......... H02K 5/20; H02K 5/225; H02K 7/003; H02K 7/14; H02K 3/521; H02K 21/16; H02K 11/33; F04D 25/068; F04D 25/0693; Y02T 10/12; F02B 39/10
See application file for complete search history.

(56) References Cited

U.S. PATENT DOCUMENTS

| 6,160,332 | A | * | 12/2000 | Tsuruhara | ............... | H02K 5/203 |
| | | | | | | 310/58 |
| 2001/0036409 | A1 | | 11/2001 | Murata et al. | | |
| 2015/0001972 | A1 | * | 1/2015 | Miyama | ............... | H02K 9/00 |
| | | | | | | 310/52 |

(Continued)

FOREIGN PATENT DOCUMENTS

| JP | 2002-021794 | 1/2002 |
| JP | 2004-274992 | 9/2004 |

(Continued)

OTHER PUBLICATIONS

International Search Report dated Aug. 24, 2021 for PCT/JP2021/026859.

(Continued)

*Primary Examiner* — Thomas Truong
(74) *Attorney, Agent, or Firm* — SOEI PATENT & LAW FIRM

(57) ABSTRACT

A rotary machine includes an electric motor including a rotor and a stator, a rotary shaft to be rotated by driving the electric motor, an impeller attached to the rotary shaft, an inverter that controls the electric motor, and a plurality of lead wires that exit from the stator and connected to the inverter. The stator includes an inner periphery facing the rotor, and an outer periphery opposite the inner periphery, and the inverter is located in a circumferential direction along the outer periphery of the stator.

20 Claims, 4 Drawing Sheets

(56) References Cited

U.S. PATENT DOCUMENTS

| | | | | |
|---|---|---|---|---|
| 2015/0249371 A1* | 9/2015 | Owen | ............... | H02K 11/0094 |
| | | | | 310/198 |
| 2017/0077779 A1 | 3/2017 | Hanioka et al. | | |
| 2018/0252223 A1 | 9/2018 | Yamasaki et al. | | |
| 2019/0345956 A1* | 11/2019 | Iizuka | ............... | F04D 25/0606 |
| 2020/0212753 A1* | 7/2020 | Okuhata | ............... | H02K 11/33 |
| 2021/0175780 A1 | 6/2021 | Sano et al. | | |

FOREIGN PATENT DOCUMENTS

| | | |
|---|---|---|
| JP | 2005-354821 | 12/2005 |
| JP | 2008-193821 | 8/2008 |
| JP | 2013-172564 | 9/2013 |
| JP | 2013-198310 | 9/2013 |
| JP | 2018-129904 | 8/2018 |
| JP | 2018-148607 | 9/2018 |
| JP | 2019-082161 | 5/2019 |
| JP | 2020-025441 | 2/2020 |
| WO | 2013/118670 | 8/2013 |
| WO | 2015/178087 | 11/2015 |
| WO | 2018/139497 | 8/2018 |
| WO | 2019/022106 | 1/2019 |

OTHER PUBLICATIONS

International Preliminary Report on Patentability with Written Opinion dated Feb. 23, 2023 for PCT/JP2021/026859.

* cited by examiner

ROTARY MACHINE WITH ELECTRIC MOTOR AND INVERTER

CROSS-REFERENCE TO RELATED APPLICATIONS

This application is a continuation application of PCT Application No. PCT/JP2021/026859, filed on Jul. 16, 2021, which claims the benefit of priority from Japanese Patent Application No. 2020-135825, filed on Aug. 11, 2020. The entire contents of the above listed PCT and priority applications are incorporated herein by reference.

BACKGROUND

Field

The present disclosure relates to a rotary machine.

Description of the Related Art

Japanese Unexamined Patent Publication No. 2019-82161 discloses an electrically-assisted turbocharger including a controller that drives a motor using an inverter. The controller is disclosed as being configured separately from the motor. International Publication WO 2013/118670, Japanese Unexamined Patent Publication No. 2013-172564, Japanese Unexamined Patent Publication No. 2004-274992, Japanese Unexamined Patent Publication No. 2013-198310, and International Publication WO 2015/178087 disclose an inverter-integrated motor device including an inverter device.

SUMMARY

Disclosed herein is an example rotary machine. The rotary machine includes, an electric motor including a rotor and a stator, a rotary shaft to be rotated by a driving of the electric motor, an impeller attached to the rotary shaft, an inverter that controls the driving of the electric motor, and a plurality of lead wires led out from the stator to be connected to the inverter. The stator includes an inner periphery facing the rotor, and an outer periphery opposite the inner periphery, and the inverter is disposed in a circumferential direction along the outer periphery of the stator.

DETAILED DESCRIPTION

Figure 1:
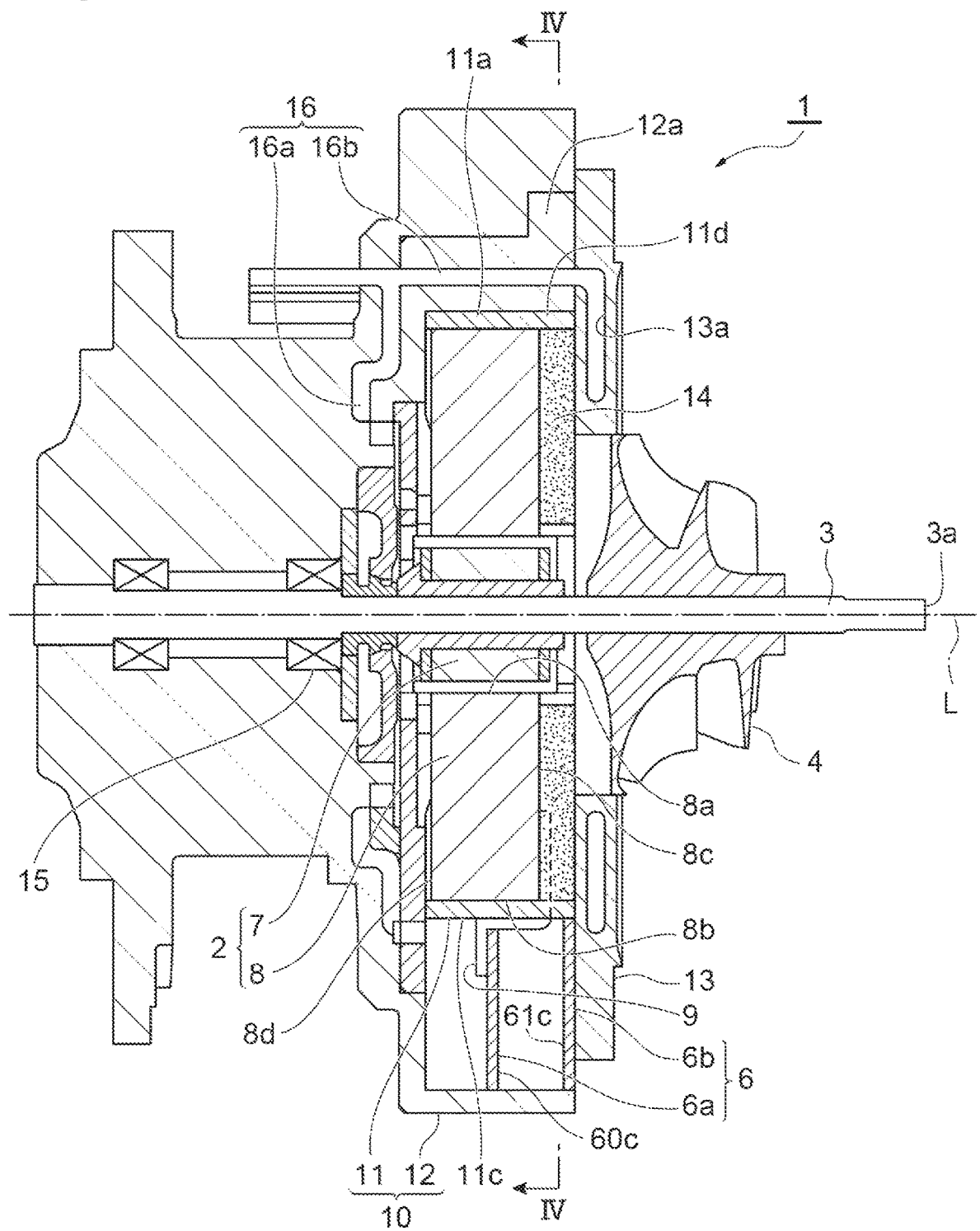
FIG. 1 is a cross-sectional view illustrating an example rotary machine.

In the following description, with reference to the drawings, the same reference numbers are assigned to the same components or to similar components having the same function, and overlapping description is omitted.

An example rotary machine includes, an electric motor including a rotor and a stator, a rotary shaft to be rotated by a driving of the electric motor, an impeller attached to the rotary shaft, an inverter that controls the driving of the electric motor, and a plurality of lead wires led out from the stator to be connected to the inverter. The stator includes an inner periphery facing the rotor, and an outer periphery opposite the inner periphery, and the inverter is disposed in a circumferential direction along the outer periphery of the stator.

In one example, the inverter is disposed in the circumferential direction along the outer periphery of the stator instead of facing an end portion of the stator, namely, an end portion in an axial direction of the rotary shaft. Therefore, the plurality of lead wires led out from the stator extend toward the outer periphery of the stator instead of in the axial direction of the rotary shaft, and are connected to the inverter. In addition, the plurality of lead wires are led out from the stator, and the inverter is disposed in the circumferential direction along the outer periphery of the stator. According to one example rotary machine, the plurality of lead wires are shortened, the size of the rotary machine in the axial direction can be made compact, and the degree of freedom in design is improved.

In one example, the plurality of lead wires may be led out from the stator at equal pitches.

In one example, the rotary machine may further include a casing disposed along the outer periphery of the stator to surround the outer periphery of the stator, and the inverter may be disposed along an outer periphery of the casing. The inverter is readily installed at a stable position by disposing the inverter along the outer periphery of the casing surrounding the stator.

In one example, the inverter may include a plurality of control substrates, and the plurality of control substrates may be disposed side by side in an axial direction of the rotary shaft. Since the plurality of control substrates are separately provided, the size of each of the control substrates can be reduced, and since the plurality of control substrates are disposed side by side in the axial direction, an increase in dimension in a radial direction orthogonal to an axis can be reduced.

In one example, the stator may include an end portion in an axial direction of the rotary shaft, and the lead wires may extend along the end portion of the stator and beyond the casing.

In one example, the casing may include an end wall portion protruding beyond the end portion of the stator in the axial direction and surrounding the end portion in the circumferential direction, and a groove portion through which each of the lead wires passes may be formed in the end wall portion. Since the lead wires extending along the end portion of the stator pass through the respective groove portions at locations where the lead wires cross the end wall portion, the lead wires can be prevented from protruding in the axial direction, and can be made compact.

In one example, the rotary machine may further include a cooling unit that faces the end portion of the stator to cool the stator, and a resin portion that thermally connects the cooling unit and the stator may be provided in an inside surrounded by the end wall portion. Since the cooling unit is disposed to face the end portion of the stator, and the inverter is not located between the cooling unit and the stator, the cooling unit can cool the stator. In addition, since a gap inside the end wall portion is filled with the resin portion, heat exchange can be performed between the cooling unit and the stator, and cooling effect can be improved.

In one example, the inverter may include a plurality of control substrates, and one control substrate among the plurality of control substrates may be disposed to face the cooling unit.

In one example, the rotary machine may further include a bearing that supports the rotary shaft. The rotary shaft may include a free end opposite the bearing with respect to the stator, and the impeller may be attached to the rotary shaft between the stator and the free end. The rotary shaft is supported in a substantially cantilevered state from the bearing to the free end. When the inverter is not disposed in the axial direction of the rotary shaft with respect to the end portion of the stator, a portion supported in a cantilevered state can be shortened, and the rotation of the rotary shaft can be stabilized.

Figure 2:
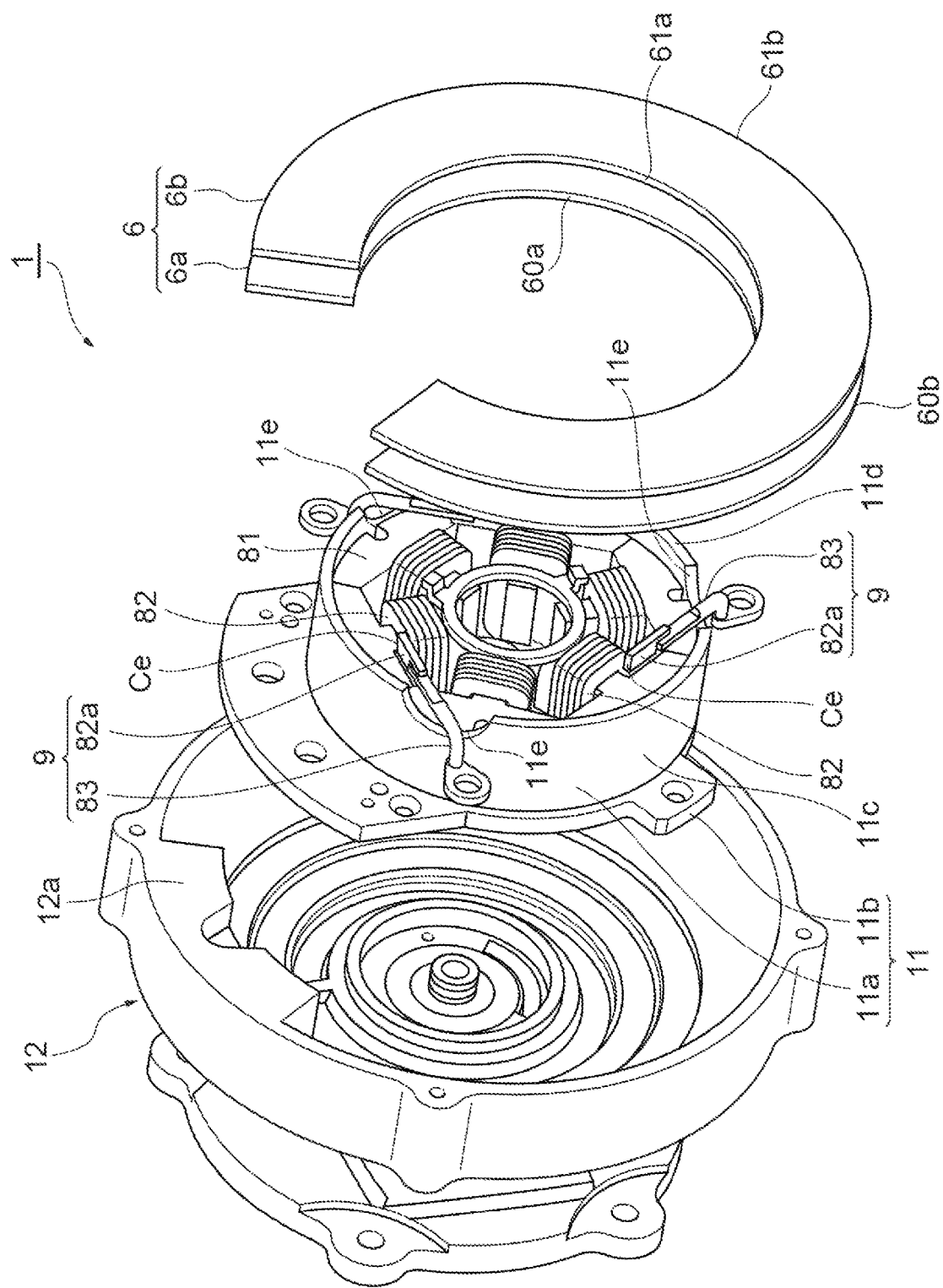
FIG. 2 is an exploded perspective view of an example rotary machine.

FIGS. 1 and 2 illustrate an example rotary machine 1 that is an electrically-assisted turbocharger. The rotary machine 1 of the present disclosure includes an electric motor 2, a rotary shaft 3 to be rotated by driving of the electric motor 2, and a compressor impeller 4 attached to the rotary shaft 3. In addition, the rotary machine 1 includes an inverter 6 that controls driving of the electric motor 2.

The electric motor 2 includes a rotor 7 fixed to the rotary shaft 3, and a stator 8 disposed to surround the rotor 7. The stator 8 includes teeth 81 and a coil 82 wound around the teeth 81. For example, the stator 8 is formed of the coils 82 of a plurality of phases, and is formed of the coils 82 of three phases. Winding ends Ce of the coils 82 of phases are disposed at a pitch of 120° (e.g., equal pitches). A conducting wire 82a led out from the winding end Ce of the coil 82 is connected to a connection terminal 83, and the conducting wire 82a is connected to the inverter 6 via the connection terminal 83. For example, the conducting wire 82a and the connection terminal 83 form a lead wire 9 led out from the stator 8.

The electric motor 2 is accommodated inside a motor housing 10. The motor housing 10 includes an inner housing 11 (e.g., a casing) surrounding the stator 8, and an outer housing 12 surrounding the inner housing 11. The stator 8 includes an inner periphery 8a facing the rotor 7, and an outer periphery 8b opposite the inner periphery 8a. The inner housing 11 is disposed along the outer periphery 8b of the stator 8, and includes a main portion 11a having a cylindrical shape surrounding the outer periphery 8b of the stator 8, and a flange portion 11b extending outward from an end of the main portion 11a. The inner housing 11 is disposed inside the outer housing 12, and is fixed to the outer housing 12 via the flange portion 11b. In addition, there is a space between the inner housing 11 and the outer housing 12, and the inverter 6 is disposed in the space.

The inverter 6 includes two (a plurality of) control substrates 6a and 6b. The two control substrates 6a and 6b have different functional roles, one control substrate 6a is a substrate for a main circuit, and the other control substrate 6b is for a control circuit. A device such as an IGBT, a bipolar transistor, a MOSFET, or a GTO, or an electricity storage device such as a capacitor is mounted on the control substrates 6a and 6b.

The inverter 6 is disposed in a circumferential direction Cd along an outer periphery 11c of the inner housing 11. The circumferential direction Cd is intended to be a circumferential direction of the main portion 11a (inner housing 11) having a cylindrical shape, and can also be described as a rotation direction of the rotary shaft 3. The main portion 11a is an example of cylindrical portion. The control substrates 6a and 6b of the inverter 6 each have a curved shape along the outer periphery 11c of the main portion 11a (the inner housing 11). For example, the curved shape is an annular shape that is partially cut out (C shape), but the curved shape is not limited to the C shape, and may be a continuous annular shape with no cutout or a shape in which a plurality of ark shapes are disposed at intervals.

The control substrates 6a and 6b are disposed along the outer periphery 11c of the inner housing 11 (main portion 11a). The control substrates 6a, 6b are surrounding a part of the outer periphery 11c of the inner housing 11 (main portion 11a). The control substrates 6a, 6b are provided between the inner housing 11 and the outer housing 12. The control substrates 6a, 6b have plate surfaces 60c, 61c, which are facing each other on a direction along with an axis L direction.

The control substrate 6a has a curved inner periphery 60a and a curved outer periphery 60b. The control substrate 6b has a curved inner periphery 61a and a curved outer periphery. The curved inner peripheries 60a, 61a face the inner housing 11 and are disposed along with the inner housing 11. The curved outer peripheries 60b, 61b face the outer housing 12 and are disposed along with the outer housing 12. For example, the control substrates 6a and 6b that are curved in a C shape are installed such that the main portion 11a of the inner housing 11 passes through centers of the control substrates 6a and 6b. The control substrates 6a and 6b are attached to at least one of the inner housing 11 and the outer housing 12. For example, an attachment member such as a bracket or a support column can be provided on the inner housing 11 or on the outer housing 12, and the control substrates 6a and 6b can be attached to the attachment member. The inverter 6 is readily installed at a stable position by disposing the inverter 6 (control substrates 6a and 6b) along the outer periphery 11c of the inner housing 11 surrounding the stator 8. In addition, the two control substrates 6a and 6b are disposed side by side in an axis L direction.

The main portion 11a of the inner housing 11 includes an end wall portion 11d protruding from an end portion 8c of the stator 8 in the axis L direction. The end wall portion 11d is provided to beyond the end portion 8c of the stator 8 and to surround the end portion 8c of the stator 8 in the circumferential direction Cd. The conducting wire 82a led out from the stator 8 and a part of the connection terminal 83 (e.g., a part of the lead wire 9) are disposed in an inside surrounded by the end wall portion 11d. The connection terminal 83 extends from the conducting wire 82a toward the outer periphery 11c of the inner housing 11, and to cross over the end wall portion 11d. The end wall portion 11d is provided with groove portions 11e for escape of the connection terminals 83 (lead wires 9). The lead wires 9 of three phases that have passed through the respective groove portions 11e are connected to the control substrate 6a for a main circuit of the two control substrates 6a and 6b of the inverter 6.

The rotary machine 1 includes a diffuser plate 13 disposed to face the end portion 8c of the stator 8. A diffuser that pressurizes suctioned air when the compressor impeller 4 rotates is formed in the diffuser plate 13. In addition, a cooling flow path 13a through which a coolant for cooling the stator 8 passes is formed in the diffuser plate 13. The diffuser plate 13 is one example of a cooling unit.

Figure 3:
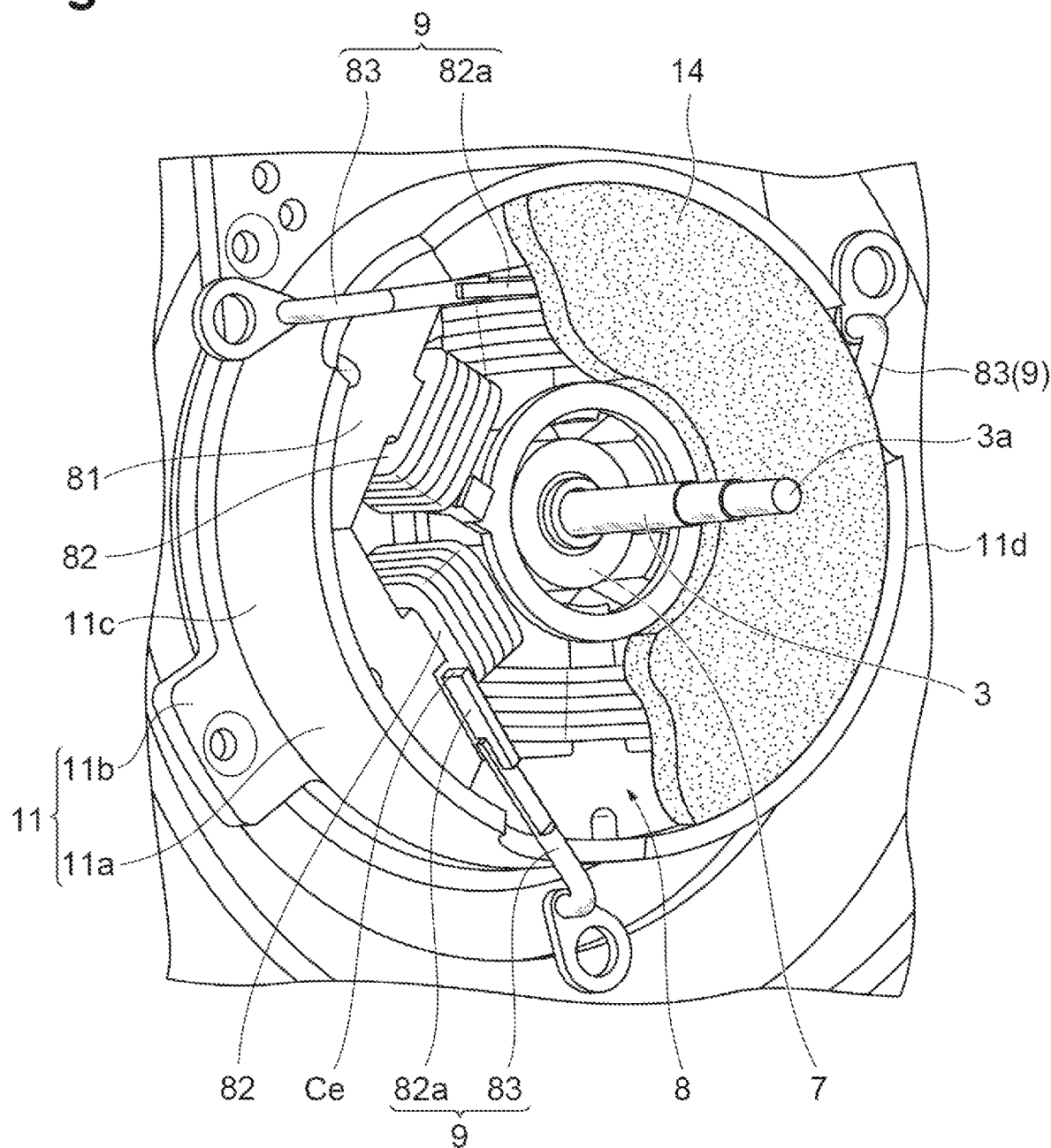
FIG. 3 is a perspective view in which an end portion of an example stator is enlarged and an example resin portion is partially cut away.

As illustrated in FIGS. 1 and 3, a resin portion 14 filled with resin for filling a gap is formed inside the end wall portion 11d. The resin portion 14 thermally connects the end portion 8c of the stator 8 and the diffuser plate 13. "Thermal connection" means a connection that allows heat exchange, and can be defined as a state where the thermal resistance is smaller than thermal resistance in a state where an air layer is interposed therebetween.

The outer housing 12 is provided with a bearing 15 that rotatably supports the rotary shaft 3. A tip of the rotary shaft 3 is a free end 3a that is open without being supported by a bearing or the like. The rotor 7 of the electric motor 2 is attached between the bearing 15 and the free end 3a. The compressor impeller 4 is attached between the rotor 7 and the free end 3a. A portion of the rotary shaft 3 between the bearing 15 and the free end 3a is supported in a cantilevered state, and the compressor impeller 4 is disposed on the portion that is in a cantilevered state.

In addition, a cooling flow path 16 through which the coolant for cooling the stator 8 or the rotor 7 passes is formed in the outer housing 12. For example, the stator 8 includes an end portion 8d on an opposite side with respect to the end portion 8c facing the diffuser plate 13, in a direction along an axis L. The cooling flow path 16 includes a main flow path 16a through which the coolant flows along the end portion 8d on the opposite side of the stator 8. In addition, the cooling flow path 16 includes a communication flow path 16b that provides communication between the cooling flow path 13a of the diffuser plate 13 and the main flow path 16a. The communication flow path 16b is provided in a communication portion 12a disposed at cutouts of the control substrates 6a and 6b of the inverter 6, of which each has C shape.

Figure 4:
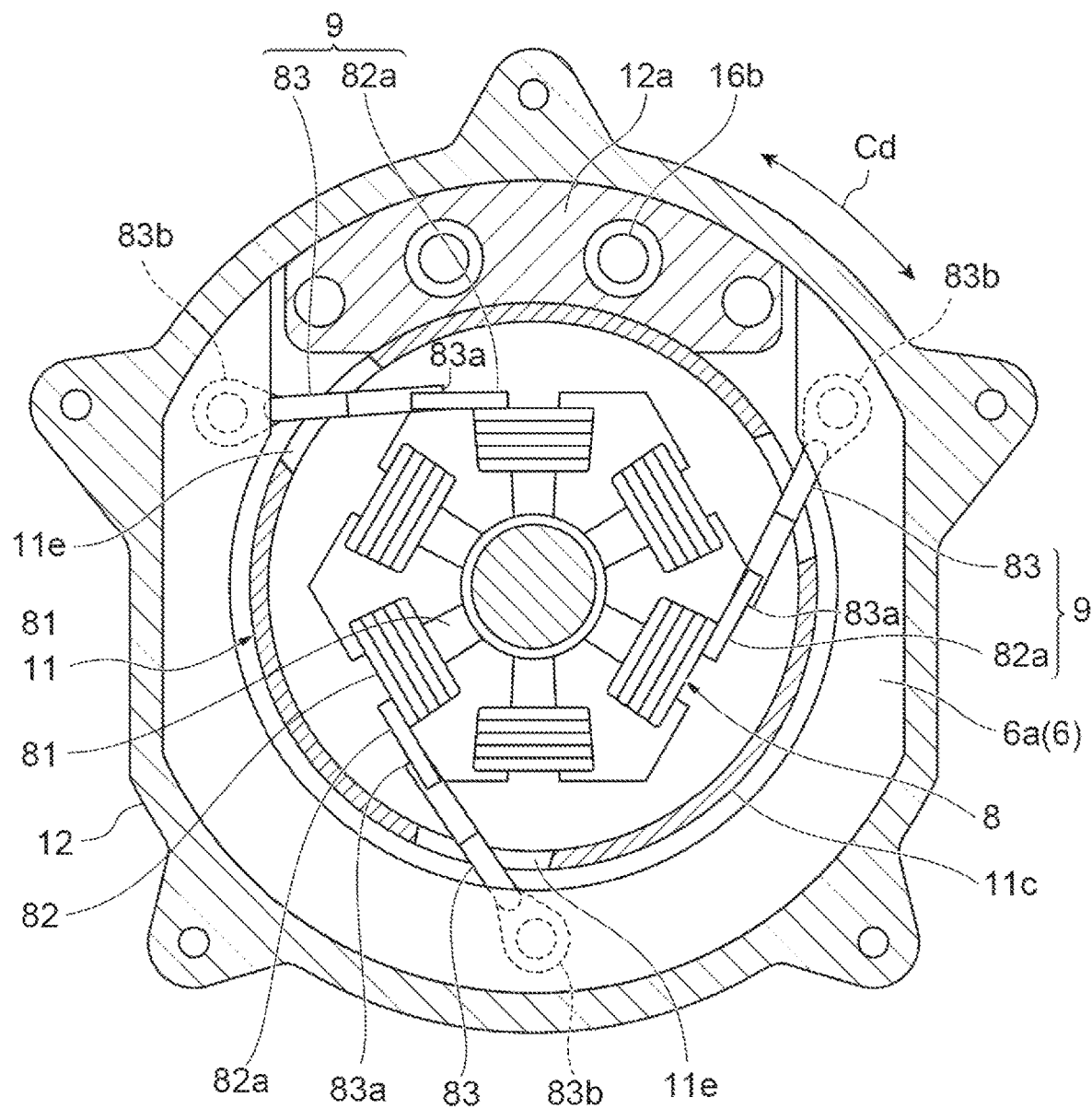
FIG. 4 is a cross-sectional view taken along line IV-IV of FIG. 1, and is a view in which the resin portion is omitted.

As illustrated in FIG. 4, the conducting wire 82a led out from the winding end Ce of the coil 82 of each phase extends in a tangential direction of the rotary shaft 3 when a cross section orthogonal to the rotary shaft 3 is assumed, and is connected to the corresponding connection terminal 83. The connection terminal 83 includes a conducting wire connection portion 83a that is one end portion to which the conducting wire 82a is fixed, and a crimped portion 83b having an annular shape that is an opposite end portion. The connection terminal 83 extends from the conducting wire connection portion 83a through the groove portion 11e of the inner housing 11, is further bent to extend along the axis L direction, and is then bent to stand upright, and the crimped portion 83b at a tip of the connection terminal 83 overlaps the control substrate 6a and is connected to the control substrate 6a.

Next, example operations of the rotary machine 1 will be described. As a comparative example, when the inverter is disposed to face the end portion of the stator, the coil of each phase to be led out from the stator is led out from the same location, and the coil of each phase is guided from the position of the corresponding winding end to one location (lead-out position). Accordingly, this may result in extra windings for guiding the coils to the same location and/or the inclusion of bus bars, so that the height of coil ends increases. As a result, the degree of freedom in design may be impaired when priority is given to realizing compactness in the axial direction of the rotary shaft.

On the other hand, in the rotary machine 1, the inverter 6 is disposed in the circumferential direction Cd along the outer periphery 8b of the stator 8 instead of facing the end portion 8c of the stator 8. Therefore, a plurality of the lead wires 9 led out from the stator 8 extend toward the outer periphery 8b of the stator 8 instead of in the axis L direction of the rotary shaft 3, and are connected to the inverter 6. As a result, a distance from a lead-out position of each of the plurality of lead wires 9 to the inverter 6 can be shortened, the size of the rotary machine 1 in the axis L direction of the rotary shaft 3 can be made compact, and the degree of freedom in design is improved. In addition, wiring inductance can be reduced by shortening a length of each of the lead wires 9. Since excessive wiring inductance leads to a reduction in motor performance when the voltage of a main electric power supply drops, the reduction in motor performance can be avoided by shortening the wiring inductance.

In addition, since the plurality of lead wires 9 of the rotary machine 1 are led out from the stator 8 at a pitch of 120° (equal pitches), and extend toward the outer periphery 8b of the stator 8, the length of the plurality of lead wires 9 can be made uniform. As a result, resistance of each phase or imbalance of inductance is reduced. A reduction in the imbalance of inductance is predominant particularly in the electric motor 2 with a low inductance in which the number of coil turns is small.

In addition, the inverter 6 includes the plurality of control substrates 6a and 6b, and the plurality of control substrates 6a and 6b are disposed side by side in the axis L direction of the rotary shaft 3. In an example, the two control substrates 6a and 6b are divided into one for a main circuit and one for a control circuit. For example, since the two control substrates 6a and 6b are separately provided, the size of each of the control substrates 6a and 6b can be reduced compared to when devices or like for realizing both functions are mounted on one control substrate. Further, since the plurality of control substrates 6a and 6b are disposed side by side in the axis L direction, an increase in dimension in a radial direction orthogonal to the axis L can be reduced.

In addition, the groove portions 11e through which the respective lead wires 9 pass are formed in the end wall portion 11d of the inner housing 11. Since the lead wires 9 from the stator 8 extend along the end portion 8c of the stator 8 and pass through the respective groove portions 11e at positions where the lead wires 9 cross the end wall portion 11d, the lead wires 9 can be prevented from protruding in the axis L direction, and can be make compact.

In addition, the rotary machine 1 includes the diffuser plate 13 in which the cooling flow path 13a that faces the end portion 8c of the stator 8 to cool the stator 8 is formed. In an example, since the inverter 6 is not located between the diffuser plate 13 and the stator 8, can cool the stator 8 in addition to be made compact in the axis L direction.

In addition, since the resin portion 14 is formed inside the end wall portion 11d of the inner housing 11, heat exchange can be performed between the diffuser plate 13 and the stator 8, and cooling effect can be improved. It should be noted that in an example, a part of the inverter 6 (control substrate 6b) is disposed on the end wall portion 11d, and further to face the diffuser plate 13. Therefore, the inverter 6 can also be cooled by the cooling flow path 13a of the diffuser plate 13.

In addition, the rotary machine 1 includes the bearing 15 that supports the rotary shaft 3, and the rotary shaft 3 includes the free end 3a opposite the bearing 15 with respect to the stator 8. The rotary shaft 3 is supported in a substantially cantilevered state from the bearing 15 to the free end 3a. Furthermore, in the rotary machine 1, since the inverter 6 is not disposed in the axis L direction of the rotary shaft 3 with respect to the end portion 8c of the stator 8, the portion supported in a cantilevered state can be shortened, and can stabilize the rotation of the rotary shaft 3.

It is to be understood that not all aspects, advantages and features described herein may necessarily be achieved by, or included in, any one particular example. Indeed, having described and illustrated various examples herein, it should be apparent that other examples may be modified in arrangement and detail. For example, the electrically-assisted turbocharger has been described as one type of rotary machine, but the present disclosure can be widely applied to rotary machines each including an impeller to be rotated by the driving of an electric motor, and may be applied to, for example, a turbocharger including a turbine.

What is claimed is:

1. A rotary machine comprising:
   an electric motor including a rotor and a stator;
   a rotary shaft to be rotated by driving the electric motor;
   an impeller attached to the rotary shaft;
   an inverter that controls the electric motor; and
   a plurality of lead wires that exit from the stator and are connected to the inverter,
   wherein the stator includes an inner periphery facing the rotor, and an outer periphery opposite the inner periphery,
   wherein the inverter is located in a circumferential direction along the outer periphery of the stator,
   wherein the inverter includes a plurality of control substrates, and
   wherein the plurality of control substrates are located side by side in an axial direction of the rotary shaft.

2. The rotary machine according to claim 1, wherein the plurality of lead wires exit the stator at equal pitches.

3. The rotary machine according to claim 1, further comprising a casing that surrounds the outer periphery of the stator,
   wherein the inverter is located along an outer periphery of the casing.

4. The rotary machine according to claim 3,
   wherein the stator includes an end portion in an axial direction of the rotary shaft, and
   wherein the lead wires extend along the end portion of the stator and beyond the casing.

5. The rotary machine according to claim 4,
   wherein the casing includes an end wall portion that protrudes beyond the end portion of the stator in the axial direction and that surrounds the end portion in the circumferential direction, and
   wherein a groove portion through which each of the lead wires passes is formed in the end wall portion.

6. The rotary machine according to claim 5, further comprising a cooling unit that faces the end portion of the stator to cool the stator,
   wherein a resin portion that thermally connects the cooling unit and at least a portion of the stator are surrounded by the end wall portion.

7. The rotary machine according to claim 6,
   wherein the inverter includes a control substrate, and
   wherein the control substrate faces the cooling unit.

8. The rotary machine according to claim 1, further comprising a bearing that supports the rotary shaft,
   wherein the rotary shaft includes a free end opposite the bearing with respect to the stator, and
   wherein the impeller is attached to the rotary shaft between the stator and the free end.

9. The rotary machine according to claim 1, further comprising:
   a diffuser plate that faces both the stator and the inverter; and
   a cooling flow path formed in the diffuser plate.

10. The rotary machine according to claim 1, further comprising:
    a diffuser plate that faces both the stator and the inverter; and
    a resin portion that thermally connects the diffuser plate,
    wherein the resin portion is located between the stator and the diffuser plate.

11. A rotary machine comprising:
    an electric motor including a rotor and a stator;
    a casing that houses the stator;
    an impeller to be rotated by driving the electric motor;
    an inverter that controls the electric motor;
    a diffuser plate that faces both the stator and the inverter; and
    a cooling flow path formed in the diffuser plate,
    wherein the casing comprises a cylindrical portion surrounding the stator, and
    wherein the inverter has a curved inner periphery that at least partially surrounds an outer periphery of the cylindrical portion.

12. The rotary machine according to claim 11,
    wherein the inverter comprises a plurality of control substrates, and
    wherein plate surfaces of the control substrates face each other along an axial direction of a shaft of the impeller.

13. The rotary machine according to claim 11,
    wherein the inverter comprises a control substrate, and
    wherein an inner surface of the control substrate forms the curved inner periphery of the inverter.

14. The rotary machine according to claim 11, further comprising a resin portion located between the stator and the diffuser plate,
    wherein the resin portion thermally connects the diffuser plate.

15. A rotary machine comprising:
    an electric motor including a rotor and a stator;
    an inner housing surrounding the stator and located in a circumferential direction along an outer periphery of the stator;
    an outer housing surrounding the inner housing and located in a circumferential direction along the outer periphery of the inner housing;
    an impeller to be rotated by driving the electric motor;
    an inverter that controls the electric motor, wherein the inverter comprises a control substrate;
    a diffuser plate that faces the control substrate; and
    a resin portion that thermally connects the diffuser plate,
    wherein the resin portion is located between the stator and the diffuser plate, and
    wherein the control substrate is located between the inner housing and the outer housing.

16. The rotary machine according to claim 15, wherein the control substrate has a curved inner periphery facing the inner housing.

17. The rotary machine according to claim 15, wherein the control substrate has a curved outer periphery facing the outer housing.

18. The rotary machine according to claim 15, wherein the control substrate comprises a curved inner periphery facing the inner housing and a curved outer periphery facing the outer housing.

19. The rotary machine according to claim 18, further comprising a cooling flow path formed in the diffuser plate.

20. The rotary machine according to claim 15, further comprising a cooling flow path formed in the diffuser plate.

* * * * *